United States Patent [19]
Gourd

[11] Patent Number: 5,102,276
[45] Date of Patent: Apr. 7, 1992

[54] REMOVABLE FASTENER WITH ELASTIC LINKING MEANS

[75] Inventor: James T. Gourd, Dearborn, Mich.

[73] Assignee: Ford Motor Company, Dearborn, Mich.

[21] Appl. No.: 551,331

[22] Filed: Jul. 12, 1990

[51] Int. Cl.⁵ .................. F16B 35/00; F16B 35/02
[52] U.S. Cl. ..................... 411/392; 411/383; 411/395; 411/403; 411/916
[58] Field of Search .............. 411/383, 392, 395, 403, 411/916, 908, 907; 29/450, 451, 456, 525.1

[56] References Cited

U.S. PATENT DOCUMENTS

| | | |
|---|---|---|
| 3,102,447 | 9/1963 | Gregory . |
| 3,296,048 | 1/1967 | Wolfe . |
| 3,367,694 | 2/1968 | Witt . |
| 3,495,494 | 2/1970 | Scott . |
| 4,348,141 | 9/1982 | Dahl . |
| 4,416,572 | 11/1983 | Black . |
| 4,437,286 | 3/1984 | Maguire . |
| 4,536,112 | 8/1985 | Horsky et al. ............... 411/395 |
| 4,589,179 | 5/1986 | Hulting, Jr. . |
| 4,854,797 | 8/1989 | Gourd ........................... 411/392 |
| 4,900,208 | 2/1990 | Kaiser et al. ................. 411/908 |
| 4,906,154 | 3/1990 | Sheppard ..................... 411/392 |
| 4,947,502 | 8/1990 | Englehardt ................... 411/392 |

FOREIGN PATENT DOCUMENTS

| | | |
|---|---|---|
| 736058 | 9/1932 | France . |
| 379230 | 6/1964 | Switzerland . |
| 512315 | 6/1976 | U.S.S.R. . |
| 838124 | 6/1981 | U.S.S.R. . |
| 838125 | 6/1981 | U.S.S.R. . |
| 3197 | of 1864 | United Kingdom . |
| 309034 | 9/1930 | United Kingdom . |
| 2140890A | 4/1984 | United Kingdom . |

Primary Examiner—Neill R. Wilson
Attorney, Agent, or Firm—Damian Porcari; Roger L. May

[57] ABSTRACT

A removable threaded fastener is provided which comprises a head component; an externally threaded shank component; and a resilient linking means connecting the head and shank components. The fastener has a longitudinal opening adapted to receive a tool for the application of torque in a driving engagement with the shank component without an integral torque transfer means. Also provided is a method for removably fastening a work piece using the removable threaded fastener by inserting the fastener through a threaded aperture in the work piece; inserting the tool into the longitudinal opening; applying torque to the shank component sufficient to cause axial displacement of the shank component against the resilient biasing of the linking means to maintain the head and shank components in axial tension; and removing the tool.

15 Claims, 2 Drawing Sheets

REMOVABLE FASTENER WITH ELASTIC LINKING MEANS

BACKGROUND OF THE INVENTION

The present invention is directed to a multipart externally threaded fastener element which is both easily removable and also provides a resilient linking means connecting a plurality of fastened work pieces having differing coefficients of thermal expansion.

DESCRIPTION OF THE RELATED ART

Rigid fasteners have been used to attach plastic panels or plates to metal plates or frames. The plastic plate has a much larger coefficient of thermal expansion than the metal plate, thereby causing the plastic plate to elongate and contract more than the metal plate in response to temperature change. This difference in thermal expansion causes the plastic plates to expand and contract more than metal plates, thus causing the plastic to warp or buckle between the rigid fasteners. The warped or buckled plastic plates display a poor finished appearance.

In addition to the problems arising form the different coefficients of thermal expansion of the plastic plate and the metal plate are thermal expansion differences between the fastener and the work piece. If the fastener is made of metal, and at least one of the plates being fastened is made of a plastic material, the axial thickness of the plate will elongate and compress at a greater rate than the length of the fastener. This leads to two problems. When the plastic plate compresses more than the metal fastener, the plate becomes loose and is subject to vibration. When the plastic plate elongates more than the metal fastener (i.e. the thickness of the plate is larger than the length of the fastener), the plastic experiences creep in the area of the fastener head. Resilient fasteners permit elongation and compression in both the fastener and the plates without loosening.

In French patent No. 736,058 issued Sept. 12, 1932, there is disclosed an elastic bolt which permits lengthening of the bolt while maintaining a compressive force between the work piece and bolt. One embodiment of the elastic bolt has a sinusoidal shape which is elongated by a nut. The elongated bolt preloads the threads and prevents the nut from loosening.

The French patent does not teach the use of an elastic bolt in a work piece without a nut. It cannot be used where there is no access to the threaded portion of the bolt. Torque applied to the shank is transferred through the bolt to the head. The application of torque to the shank will tend to cause twisting of the bolt. The twisting deforms the bolt and reduces its strength. The twisting also may interfere with the removal of the bolt from a workpiece.

In my U.S. Pat. No. 4,854,797, issued Aug. 8, 1989, there is disclosed a threaded fastener with resilient linking means for use in a work piece. This fastener does not require a nut to elongate the bolt and hold a work piece in compression. A torque transmitting mechanism transfers torque applied to the head component to the shank component and causes axial displacement of the shank component in an aperture in a work piece against the resilient biasing of the resilient linking means. The torque transfer means is integrated into the bolt and designed to break as a predetermined torque is applied to the bolt head. After the torque transfer means has broken, the fastener is no longer removable.

The U.S. Pat. No. 4,854,797 was particularly useful when it is necessary that a bolt not be over-torqued. The integral torque transfer means is made of a sufficiently stiff material to overcome the resilient biasing of the linking means. After the resilient biasing means is extended sufficiently, additional torque causes the torque transfer means to break. The integral torque transfer means prevents over-torquing the resilient linking means but fasteners using it are complex to fabricate and assemble.

It is an object of my invention to provide a low cost, easily manufacturable, removable threaded fastener having a resilient linking means which when installed in a work piece maintains a compressive force between the fastener and work piece.

Another object of my invention is to provide a fastener with a resilient linking means which permits a limited amount of axial and lateral compression and elongation of the work piece and still maintain a compressive force between the fastener and work piece. This and other objects and advantages of my invention will be made apparent by the following disclosure of the invention and discussion of the preferred embodiments.

SUMMARY OF THE INVENTION

According to the present invention, a removable threaded fastener is provided which comprises a head component; an externally threaded shank component; and a resilient linking means connecting the head and shank components. The fastener has a longitudinal opening adapted to receive a tool for the application of torque in a driving engagement with the shank component without an integral torque transfer means.

The present invention also provides a method for removably fastening a work piece using the removable threaded fastener by inserting the fastener through a threaded aperture in the work piece; inserting the tool into the longitudinal opening; applying torque to the shank component sufficient to cause axial displacement of the shank component against the resilient biasing of the linking means to maintain the head and shank components in axial tension; and removing the tool.

A plate having an aperture slightly greater than the threaded shank component is secured to another plate or mounting bracket having internal threads corresponding to the externally threaded shank component. The fastener is inserted through the outer plate and screwed into the threaded inner plate or plate. The application of torque causes displacement of the shank component against the resilient biasing of the resilient linking means. The torque application is then removed and the two plates are firmly attached through the axial tension of the resilient linking means.

The resilient fastener of this invention can absorb both the axial displacement due to the change in thickness of the plastic plate, and the lateral displacement normal to the fastener axis due to the change in length of the plastic plate, as the plastic plate undergoes thermal elongation and compression.

Once the fastener is installed, further axial displacement of the plates is permitted by a slight elongation of the resilient linking means. Lateral movement between the plates is also permitted by the elongation and bending of the resilient linking means. Axial contraction of the plate or wear in the vicinity of the head component is absorbed through contraction of the resilient linking means. The resilient fastener is able to maintain a tight connection over a broad range of temperatures and after partial wear of the fastener head or outer plate.

One application for the present invention is to fasten a plastic body panel to a metal frame such as a plastic pickup bed to a metal chassis. The difference between the coefficient of thermal expansion between the plastic and metal are particularly suited to the fasteners of the present invention. The fasteners securely attach the pickup bed to the chassis and permit elongation and contraction of the plastic with respect to the metal. The pickup bed may be easily removed for replacement or maintenance.

It is an advantage of the present invention to provide a low cost, easily manufacturable, removable threaded fastener containing a resilient linking means between the head and shank components. It is a further advantage of the invention to provide a fastener which permits a limited amount of axial compression and elongation of the work piece and still maintain a compressive force between the fastener and work piece. It is a further advantage of my invention to provide a fastener which permits a limited amount of lateral compression and elongation of the work piece without buckling or warping and still maintain a compressive force between the fastener and the work piece.

An additional benefit of resilient fasteners lies in a cushioning effect between the plates. Plates attached using the resilient fastener are permitted some axial and lateral movement with respect to one another. Shocks and bumps are partially absorbed by the resilient linking means.

BRIEF DESCRIPTION OF THE DRAWINGS

The earlier mentioned objects and advantages as well as others will become apparent to those skilled in the fastener arts after reading the following description with reference to the accompanying drawing in which.

DESCRIPTION OF PREFERRED EMBODIMENTS

In view of the present disclosure those skilled in the fastener arts will readily recognize the usefulness of the present invention in numerous applications in which an assembly is formed, for example, by attachment of a first component to a second component. Thus, for example, the threaded fastener of the invention can be used to fasten together adjacent plates or to fasten a plate to a frame member, such as in the assembly of a motor vehicle body, etc. The threaded fastener of the invention is particularly useful for attaching together two or more adjacent sheets or plates having different coefficients of thermal expansion. The axial resiliency of the fastener facilitates lateral shifting of fastened components over each other without buckling even when one or both are plastic. In such applications, it is particularly preferred that the fastener components having an interface with the fastened components comprise plastic material, rather than metal or the like, to reduce or eliminate wear of the plate at such interface. Also, the resilient linking means according to certain embodiments of the invention provides a substantial measure of lateral flexibility as well as axially elastic resiliency. This can be advantageous in allowing a fastened assembly to absorb lateral impact and/or to allow relative lateral shifting of one component relative another in the assembly due to thermal expansion/compression or the like.

Figure 1:
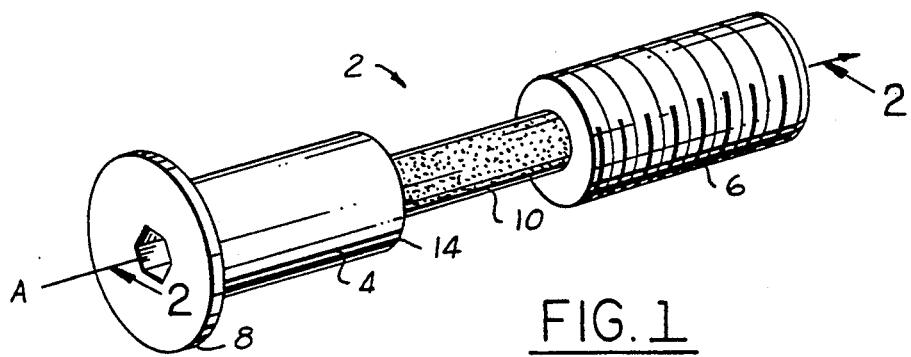
FIG. 1 is a perspective view of a removable threaded fastener in accordance with the present invention.

Turning now to FIG. 1, fastener 2 essentially is illustrated as comprising three components, a head component 4, an externally threaded shank component 6, and a resilient linking means 10.

Head component 4 consists of a lower portion 14 and a unitary circular lip portion 8 having an external diameter larger than the external diameter of lower portion 14.

Shank component 6 is formed as a generally cylindrical externally threaded member and includes an opening 12 for receiving the direct application of torque from a tool.

Resilient linking means 10 coaxially connects head component 4 to shank component 6 a fixed axially spaced distance apart while fastener 2 is in a free state. Hexagonal openings 12 extend longitudinally along axis A and centrally through head component 4, resilient linking means 10 and shank component 6.

Figure 2:
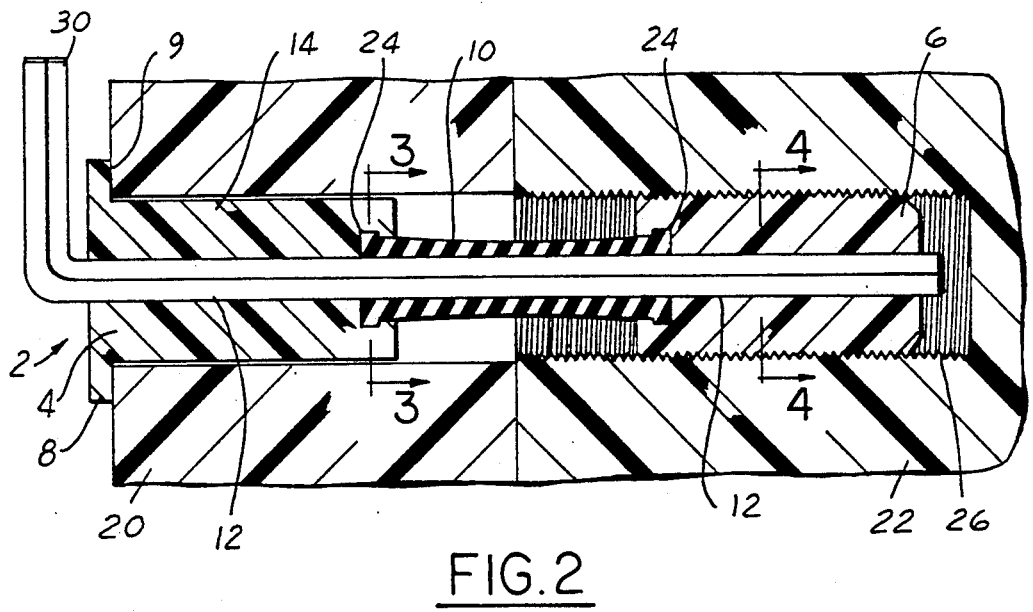
FIG. 2 is a cross sectional view of the removable fastener of FIG. 1 taken along the line 2—2 of FIG. 1 and showing an assembly of two work pieces.

Threaded fastener 2 is shown in FIG. 2 attaching an outer plate 20 to an inner plate 22. Inner plate 22 may be any internally threaded component such as a bracket, plate or nut. Inner plate 22 has internally threads 26 machined to threadedly receive shank component 6. Outer plate 20 has a clearance opening 25 to permit the unencumbered insertion and rotation of fastener 2.

Resilient linking means 10 coaxially connects shank component 6 with head component 4 and has an outer diameter smaller than the diameter of shank component 6.

Figure 3:
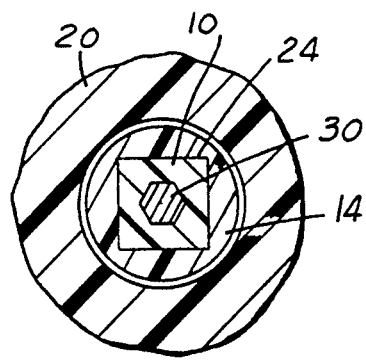
FIG. 3 is a cross sectional view of the fastener shown in FIG. 2 taken along the line 3—3.

The preferred embodiment of the invention restricts the movement of the head and shank components with respect to the resilient linking means. A variety of means exist and are well known in the art for firmly attaching resilient linking means 10 to head and shank components 4, 6. To achieve this firmly secured and rigid connection, resilient linking means 10 may be molded into a square opening or grove 24 within the head and shank components 4, 6, as is more clearly shown in FIG. 3.

Alternatively, head component 4, shank component 6 and resilient linking means 10 may be essentially simultaneous manufactured through coinjection. In this coinjection process, a hexagonal mandrel is inserted through a mold and head and shank components and resilient linking means are injection molded around the hexagonal mandrel. As the mandrel is removed, a coaxially aligned hexagonal opening 12 runs through the threaded fastener.

Hexagonal openings 12 are configured to mate with a hexagonally shaped wrench 30. Hexagonal wrench 30 is inserted through hexagonal openings 12 in fastener 2. As will be more fully described below, in the preferred embodiment of my invention, torque is simultaneously applied to the head component 4, resilient linking means 10 and shank component 6 to maintain alignment of hexagonal openings 12 and to prevent the twisting of resilient linking means 10. The head and shank components 4,6 and resilient linking means 10 of the preferred embodiment all turn together.

An alternative embodiment of fastener 2 permits the application of torque solely to shank component 6. In this alternative embodiment (not shown), head component 4 and resilient linking means 10 are made with an opening larger than hexagonal opening 12 in shank component 6. Hexagonal wrench 30 only applies torque to shank component 6. If rotation of shank component 6 with respect to either resilient linking means 10 or head component 4 is desired, for example when head component 4 must remain stationary with respect to outer plate 20, then this alternative embodiment is used and opening 24 is made circular.

Figure 6:
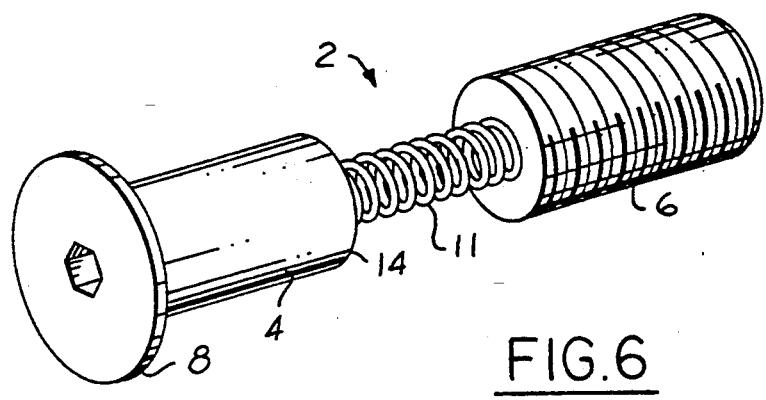
FIG. 6 is a perspective view of an alternative embodiment of the removable threaded fastener.

In the alternative embodiment of fastener 2 shown in FIG. 6, resilient linking means 11 is a metal coil spring which may be elongated a distance greater than its free state length. Resilient linking means 11 may be attached to head and shank component 4, 6, by a variety of techniques. Preferably, resilient linking means 11 is placed in an injection molding tool and head and shank components 4, 6 are formed about either end. The alternative embodiment shown in FIG. 6 has the advantage that the metal spring has a low coefficient of thermal expansion which minimizes the elongation and compression fastener 2 undergoes due to a change in temperature.

Figure 4:
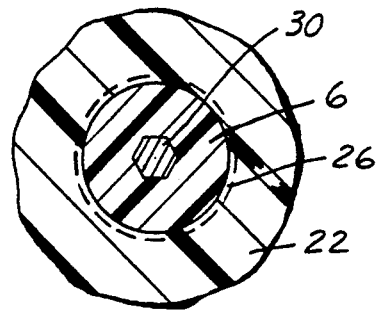
FIG. 4 is a cross sectional view of the fastener shown in FIG. 2 taken along the line 4—4.

The installation and use of the resilient fastener 2 shall be described below and shall generally refer to FIGS. 2 and 4. The alignment of hexagonal openings 12 through head component 4, resilient linking means 10 and threaded shank component 6, permits the free insertion of hexagonal wrench 30 therethrough. Fastener 2 is freely threaded within inner threads 26 until lip portion 8 engages contact area 9 of outer plate 20. Fastener 2 is screwed beyond this initial engagement thereby elongating resilient linking means 10 and causing the axial displacement of shank component 6 against the resilient biasing of resilient linking means 10 to maintain the head and shank components in axial tension. The elongation of resilient linking means 10 lengthens fastener 2 a distance greater than its free state length.

Resilient linking means 10 is not fully elongated and axial elongation (i.e. increasing thickness) of plates 20, 22 further axially elongates resilient linking means 10. Axial compression (i.e. decreasing thickness) of plates 20, 22 reduces the amount of elongation of resilient linking means 10, but resilient linking means 10 always remains elongated a distance greater than its free state length. This constant elongated state of resilient linking means 10, even when plates 20, 22 are axially compressed (i.e. decreased thickness), maintain plates 20, 22 and fastener 2 in compression at all temperatures. This continuous axial compression of fastener 2 with respect to plates 20,22 also maintains a preload on threads 26 thereby reducing any tendency for fastener 2 to rotate free or loosen from the work piece.

Threaded fastener 2 may be easily removed using the opposite procedure of installation. Hexagonal wrench 30 is inserted into hexagonal openings 12. Threaded shank 6 is unscrewed from inner threads 26, and fastener 2 is removed.

The preferred embodiment of my invention does not permit the free axial rotation of either head component 4 or shank component 6 with respect to resilient linking means 10. As fastener 2 is screwed into plates 20, 22, lip portion 8 engages outer plate 20 in the vicinity of contact area 9. Continued rotation of fastener 2 causes the axial displacement of shank component 6 and rotation of lip portion 8 about contact area 9. Hexagonal openings 12 transfer torque from hexagonal wrench 30 primarily to shank component 6, however, hexagonal wrench 30 also applies torque to head component 4 and resilient linking means 10 to maintain the alignment of openings 12 and to prevent any twisting of the resilient linking means 10. Twisting tends to unravel and shorten resilient linking means 10 and interfere with the easy removal of wrench 30. Firmly securing head and shank components 4, 6 to resilient linking means 10 maintains the axial alignment of hexagonal openings 12 throughout the entire length of threaded fastener 2.

Figure 5:
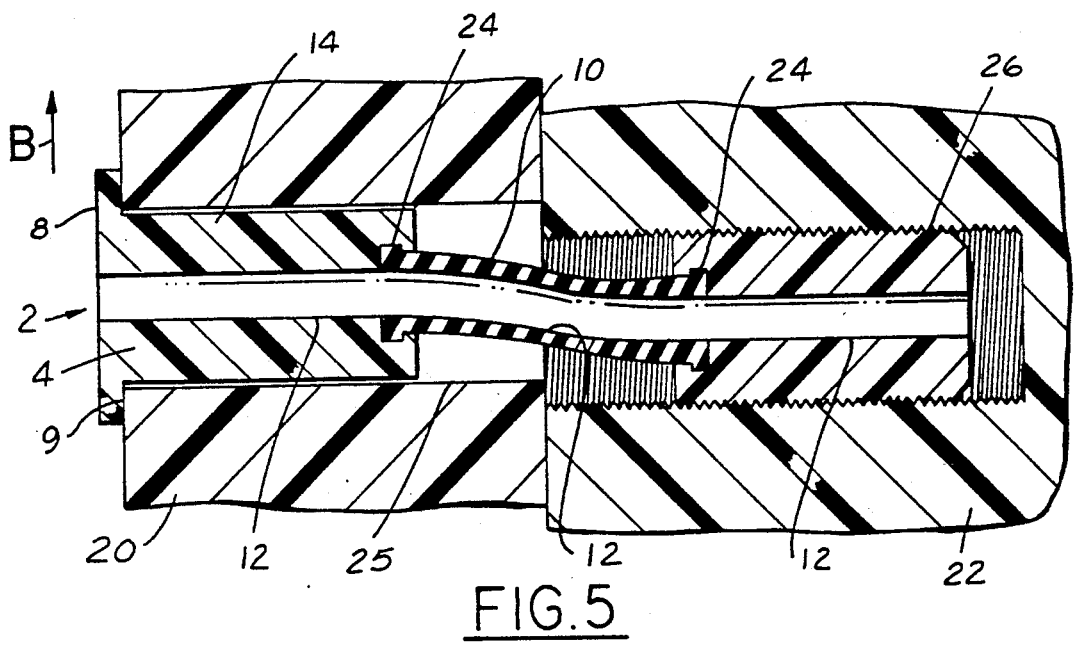
FIG. 5 is a cross sectional view of the fastener shown in FIG. 2 undergoing lateral displacement between the two plates.

Threaded fastener 2 is shown undergoing a lateral displacement of plate 20 along the direction of arrow B in FIG. 5. Resilient linking means 10 is slightly distended and distorted from this lateral displacement but continues to transfer a compressive load between inner and outer plates 20, 22. Lip portion 8 may freely rotate about contact area 9 without unscrewing shank component 6 from inner plate 22.

Head component 4 and shank component 6 may be made of any suitable material including metal or plastic, but are preferably made of a plastic material such as nylon or polytetrafluoroethylene. Resilient linking means 10 may be made of any resilient or elastomeric material having suitable compression and elongation characteristics. Typical materials include natural and synthetic rubbers and elastomeric plastic, of which many are known to one skilled in the art, some of which are commercially available, such as a product sold under the name TEXIN ® by Mobay Chemical Corporation. Resilient linking means 11 may be a metal or plastic spring. The spring may be of a coil type or leaf type design.

It should be recognized and understood that the foregoing description of presently preferred embodiments of the invention are presented for exemplification and not limitation of the invention. Certain modifications and variations of the fastener will be apparent to the skilled of the arts in view of the present disclosure and the present or future state of the art, which modifications and variations are intended to be within the scope of the following claims.

I claim:

1. A removable threaded fastener comprising:
   a head component;
   an externally threaded shank component;
   a resilient linking means made of an elastomeric material connecting said head and shank components; and
   means defining a longitudinal opening adapted to receive a tool in driving engagement with said shank component for the application of torque thereto.

2. The removable threaded fastener of claim 1 wherein said longitudinal opening extends through said head component, shank component and said resilient linking means.

3. The removable threaded fastener of claim 2 wherein said resilient linking means is cylindrical.

4. The removable threaded fastener of claim 1 wherein said elastomeric material is selected from the group consisting of natural and synthetic rubbers and elastomeric plastic.

5. The removable threaded fastener of claim 1 wherein said head component and said shank component are formed of the same material.

6. The removable threaded fastener of claim 5 wherein said material is plastic.

7. The removable threaded fastener of claim 2 wherein said longitudinal opening is slotted and said tool applies torque substantially equally to both said head component and said shank component.

8. The removable threaded fastener of claim 7 wherein said slotted longitudinal opening is hexagonal.

9. A removable threaded fastener comprising:
   a head component for the application of torque having a lip portion and a lower portion of smaller diameter than said lip portion, said lower portion being unitary and coaxial with said lip portion;
   an externally threaded shank component;
   a resilient linking means connecting said lower portion and said shank component on a common axis, said resilient linking means of smaller diameter than said shank component; and
   said fastener having a longitudinal hexagonal opening along said common axis adapted to receive a tool in driving engagement with said head and shank components and said resilient linking means for the application of torque simultaneously thereto.

10. The removable threaded fastener of claim 9 wherein said head and shank components are plastic and said resilient linking means is formed from a material selected form the group consisting of natural and synthetic rubbers, and elastomeric plastics.

11. The removable threaded fastener of claim 9 wherein said resilient linking means is a coil type spring.

12. The removable threaded fastener of claim 9 wherein said resilient linking nonrotatably connects said head and shank components.

13. A method for removably fastening a plate member to an internally threaded work piece using a threaded fastener which comprises: a head component, an externally threaded shank component, a resilient linking means connecting said head and shank components, said fastener having a longitudinal opening adapted to receive a tool in driving engagement with said shank component for the application of torque thereto, said method comprising:
   threadedly engaging said fastener with said threaded aperture in said work piece;
   inserting said tool into said longitudinal opening; and
   applying torque to said shank component sufficient to cause axial displacement of said shank component against the resilient biasing of said linking means to maintain said head and shank components in axial tension, said torque being applied simultaneously to said head component and said shank component sufficient to cause said head component and shank component to rotate equally.

14. The fastening method of claim 13 and further including removing said tool after applying torque to said shank component.

15. The fastening method of claim 13 and further comprising:
   applying torque simultaneously to said dean component and said shank component sufficient to cause said head component and shank component to rotate equally.

* * * * *